May 7, 1968     E. R. BERGLAND     3,381,395

SPEED READING GUIDE INSTRUMENT

Filed Aug. 3, 1966

INVENTOR.
EARL R. BERGLAND
BY
ATTORNEY

3,381,395
SPEED READING GUIDE INSTRUMENT
Earl R. Bergland, 6438 S. Louthan,
Littleton, Colo. 80120
Filed Aug. 3, 1966, Ser. No. 569,935
10 Claims. (Cl. 35—35)

The present invention relates to a reading guide instrument and, more particularly, to a Speed Reading Instrument.

In connection with the teaching of more effective and efficient reading, it has previously been noted that the speed of reading can be increased by the provision of means which will focus the reader's attention directly to the material that is to be read. In order to concentrate the reader's attention or to focus his view on words or groups of words, others have previously provided various types of display devices which would flash information a sentence or a line at a time. Others have also used guideline marker types of instruments which could be moved progressively down the page to underscore the reading material.

While some of these earlier devices have adequately served the intended purposes, and while such devices have provide their potential by increasing the reading speed and comprehension of users, it is believed that most of the devices have not seen widespread usage due to the cumbersome nature of the mechanisms, difficulties in use, or due to excessive costs of manufacture and market presentation.

In order to avoid some of the earlier experienced difficulties while retaining the potential benefits of such developments, the present invention provides speed reading instruments incorporating new and beneficial features which may be economically manufactured and sold.

Other objects of the present invention are:

To provide instruments which may be conveniently handled by an individual user while reading books, magazines, newspapers or sheet materials;

To provide an instrument of convenient shape and size for hand operation and usage;

To provide an instrument made of separable components which can be used selectively to facilitate the teachings of speed reading;

To provide instruments that may be formed, cast or molded from different materials to provide a basic speed reading instrument adapted to receive various attachments for facilitating the teaching of speed reading to students at different levels of competence;

To provide a unit which may be conveniently carried by the reader so that it will be available for all reading activities;

To provide a unit that may be used as a book mark;

To provide a speed reading instrument having attachments for vertically and horizontally defining the focal area of reader attention.

Figure 1:
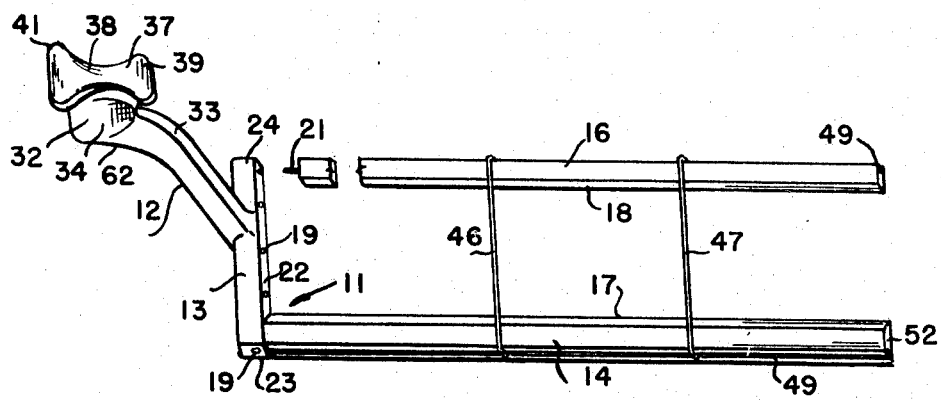
Figures 4, 5:
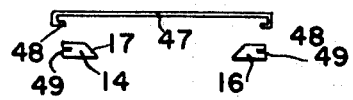
Figure 2:
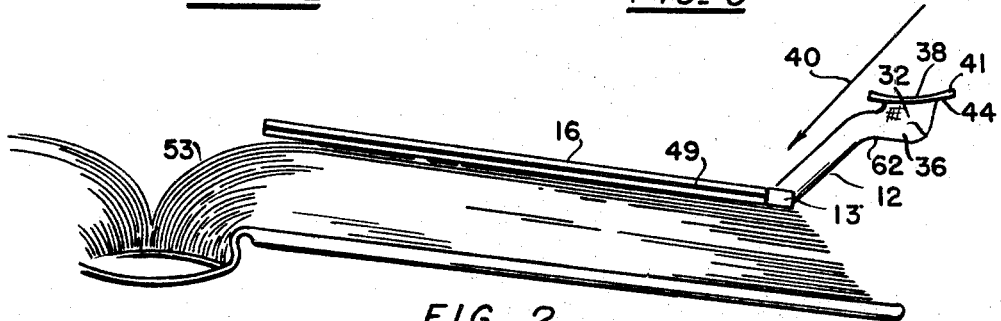
Figure 3:
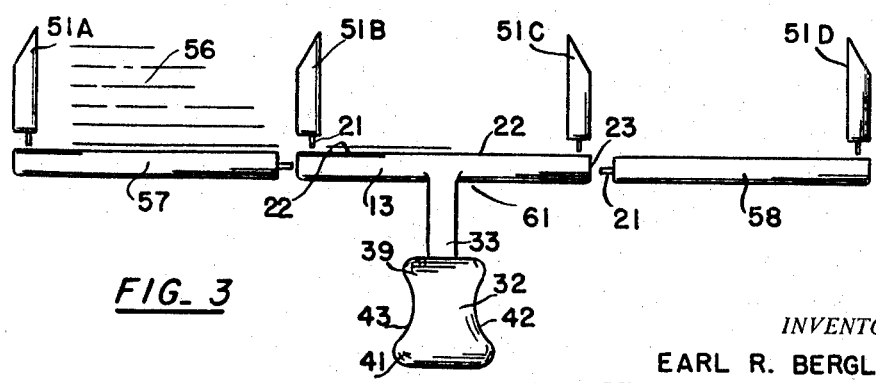

Further objects and advantages of the present invention will be apparent from the appended description and drawings, in which FIG. 1 is a perspective illustration showing details of a preferred embodiment of the invention with parts in detached and broken section, FIG. 2 is a side elevation showing use of the instrument, FIG. 3 is a top plan view showing a different use of the basic support unit with various attachments disposed in near assembled relationship, FIG. 4 is an end elevation showing further details of a blocking clip, and FIG. 5 is an end elevation showing similar features of a pointer.

Briefly stated, the present invention provides a speed reading instrument for directing and guiding a reader's attention which incorporates provisions for the use of various attachments on a basic supporting handle. The different attachments may be used to focus reader attention. The basic support handle provides cooperative means to facilitate the attachment of guides and attention divider elements which may be used to direct the reader's attention along horizontally oriented reading materials. Further attachments are likewise provided for presenting horizontally disposed materials in vertically divided groups or blocks to train readers to recognize written materials in phrase or word group patterns.

As shown in the drawings, the basic instrument is comprised of a handle element adapted for convenient gripping by the thumb, first and/or second finger of a user's hand. A depending support is attached to a cross element, and the cross element is adapted to receive various attachments in selected positions so that an assembled unit may be used for focusing the reader's attention. An assembled unit may be used to direct the reader's attention horizontally along a guide attached to the cross element that is moved progressively down a page of reading materials, or the support handle may be used in rotated position to effectively break the reading material into vertically divided blocks of information for the reader's selective attention. Further blocking or pointer attachments are provided for selective use when it is desired to introduce the reader to the techniques of word pattern recognition. With all units or attachments the main function of the reading instruments disclosed herein is to focus the reader's attention to specific areas of a printed page, and as the guide is moved the materials will be exposed in sequence as written. Since the instrument is to be used to increase the user's speed reading capabilities, a main function of the device is to provide an instrument which may be conveniently handled, manipulated and used or moved by the user.

Various embodiments of a reading guide instrument that have been found useful in the teaching of speed reading are shown in the accompanying figures. In FIG. 1 the reading guide instrument 11 includes the basic support handle 12 with its attached cross member 13 disposed in vertical position and selectively providing support for horizontally disposed guides 14 and 16. Guides 14 and 16 extend outwardly from the cross member 13 in parallel relationship so that in the use of the device a plurality of lines of written or printed material will be presented between the edges 17 and 18 of the bottom and top guides 14 and 16, respectively. In order to hold the guides 14 and 16 in this desired position, the cross member 13 of handle 12 is provided with a plurality of receptacle holes 19 into which the peg locking members 21 disposed on the ends of the guides 14 and 16 may be inserted. The receptacles 19 are provided not only on the forward edge 22 of the cross member 13 but are also provided at the end edges 23 and 24. The receptacles in the end edges may be used for other attachments, as shown in FIG. 3.

The speed reading instrument illustrated as a unit 11 in FIG. 1 facilitates the focusing of reader attention, and a trained speed reader will be able to move his eyes and attention horizontally from left to right through the area defined by the guides 14 and 16. As such materials are assimilated, the unit 11 will be moved progressively down the page. An experienced reader will adopt a constant or regulated movement pattern from the top to the bottom of the page, and as experience is gained in the use of the instrument, a marked improvement in the speed of reading will be noted. Since this embodiment of the instrument is intended for use in a horizontally oriented pattern, it is highly desirable that the instrument be conveniently formed in order to facilitate such usage. The handle elements 32 of the basic support handle 12 are, accordingly, made to have a distinctive shape which will facilitate such usage. The upwardly and rearwardly bent shank 33 of the support 12 is provided at its upper end with opposed side faces 34 and 36 that may be gripped by the user's thumb, first and/or second finger. A gripping or pinching force directed against such side faces will be adequate to hold and move the unit 11 along a page of written material as desired. A top or key element 37 is also provided adjacent such lateral gripping faces 34 and 36 which will further facilitate the holding and movement patterns for such instrument.

The top element 37 is illustrated as being of saddle or kidney like shape. This type or form is conveniently adapted to a user's finger dexterity. The dished center 38 and laterally extended forward and rear ears 39 and 41 provide convenient gripping points or a rest for the user's first finger, while the side curves 42 and 43 between the extended ears 39 and 41 provides relief or clearance for the fingers and thumb. The underneath surface 44 of the top 37 provides an additional gripping element. The total structure of the handle 32, accordingly, is cooperatively derived to facilitate convenient handling and manipulation of the speed reading instruments by the user's fingers and thumb. Actually, the handle is of such shape that it may be conveniently held in the left or right hand, and it is further of such design that it may be held without strain in either hand when the support handle 12 or shank 33 is disposed in position aligned with the reading material on the page or at right angles with the lines thereof.

The shank 33 is extended rearwardly and upwardly at an angle away from the cross member 13 so that the handle 32 will be disposed in an out of the way and non-interfering position with the reading materials to be observed. When the shank 33 is disposed horizontally as shown in FIGS. 1 and 2, the handle can obviously be kept out of an interfering position. When the shank is disposed vertically and at right angles to the line arrangement of the reading materials, a viewing angle as shown by the arrow 40 in FIG. 2 can still be maintained without visual interference. FIG. 3, in which the view is taken perpendicularly to the sheet of reading material, further illustrates the viewing clearance provided by the rearwardly and upwardly disposed shank 33.

The handle 32, shank 33 and cross member 13 together comprise a basic support unit to which other attachments may be affixed in order to facilitate different speed reading exercises. In FIG. 1 guides 14 and 16 have been attached and are both disposed horizontally so that reading materials between these guides will receive the focal attention of the reader. For more advanced readers, a single horizontally positioned guide such as the guide 14 could be used. When a single guide is to be used, any extra elements may be removed. Incidentally, the support makes it possible for the reader to choose the attachments in accordance with his individual preference. For instance, some readers would use the lower guide 14 only, while others might use guide 16 disposed at the upper end of the cross member 13 which would be moved down the page above the materials being read. The multiple holes 19 further make it possible to adjust the instrument so that the distance between the guides may be changed. This change in the separation distance for the guides 14 and 16 again makes the present instrument adaptable to individual requirements.

In addition to the guides 14 and 16, the instrument illustrated in FIG. 1 further provides blocking elements 46 and 47. These elements are made in the form of clips which may be positioned to extend between the guides 14 and 16. As shown in FIGS. 1 and 2, such a clip 47 can be provided with return lips 48 for engagement in the grooves 49 of the guides 14 and 16. These blocking elements can serve to divide the materials on a printed page into phrase or word groups which a trained speed reader will be able to recognize at a glance so that his reading pattern can be improved to further increase his reading speed. The blocking elements 46 and 47 may, of course, be moved along the length of the guides 14 and 16 to provide for adjustments in the attention span of the reader as reading skills are improved.

If a single guide, such as the guide 14, is to be used, a pointer 51 as illustrated in FIG. 5, or multiple pointers, may be provided. The pointers can be disposed at the outermost end 52 of the guide 14 or at selected intermediate positions between such end and the cross member 13.

FIG. 2 illustrates use of the guide instrument to pace the observation of printed materials in a book 53. This figure further illustrates the use of the reading guide 11 when the handle 32 is disposed for movement by the right hand of the reader.

Different manners of use of the speed reading instruments made in accordance with this invention are illustrated in FIG. 3. Here, the handle 32 and shank 33 are disposed in vertical position or in position at right angles to the orientation of the reading materials 56. When the instrument is disposed in this direction, the handle, shank and cross member 13 alone can provide an adequate reading guide instrument or unit 61. This basic unit 61 can be selectively provided with various additional attachments to facilitate a progressive speed reading instructional program. The pointers 51B and 51C can be attached to the cross member 13 by use of the lock pins 21 to confine and define a small area of attention for beginners or others who continue to prefer a smaller focal area. As requirements change, the extension elements 57 and 58 may be added to the basic unit 61 to provide a lengthened cross member combination. The elements 57, 13 and 58 can be of sufficient length to underline a full line of text, and, accordingly, the attention guiding function of this combination is comparable to the function of the horizontal guide member 14 previously described. If it is still desirable to present the written material in group arrangement, the pointers 51A and 51D and the intermediate pointers B and C may be installed to facilitate any desired instructional program.

Since all of the elements of the reading guide instruments may be made of transparent materials, the intermediate positioning of the points 51B and 51C will not necessarily disrupt or disturb the reader's view. Actually, because of the distinctive shape for the handle 32, it is desirable that the instruments be made of a cast or molded material. The construction is, accordingly, readily adaptable to the use of plastics. As a matter of preference, the instruments can then be made transparent, translucent or opaque. Since it is desirable that the instruments be readily available for reader usage, it is preferred that the units be of relatively lightweight construction. If the instrument is light in weight, yet sturdy, it could be conveniently carried in the user's pocket for use at any time that reading materials are to be read. Desirably, all elements of the units will be of such small dimension or thickness that they will not substantially interfere with the user's field of observation. When the units are relatively thin, the guide instrument can be left in a bound volume as a book marker without damage to the book.

Use of instruments of the types illustrated in classroom instruction has shown that the reading skills of students can be substantially improved. While use of the separate configurations can be beneficially demonstrated in the classroom, it has been found that individual students will have individual preferences for the particular form of instrument which suits their own requirements best. The fact that these instruments are adaptable to the satisfaction of such individual requirements represents an advantage of the present invention. The simplicity of construction is a further beneficial feature, since the unit and its many attachments may be easily introduced to students.

The particular form of handle illustrated has been chosen because of the many ways that such handle can be engaged and comfortably held by the user's fingers. The opposed side faces 34 and 36 and the opposed top and underneath surfaces 38 and 44 disposed generally at right angles to the said side surfaces facilitate many different gripping combinations that may be used without fatigue. A finger may also be placed against the bottom surface 62 of the shank 33 to hold and move the reading unit. With all of the various potential finger dispositions, it is easy to move the guide element being used down a page of reading material.

These features contributing to convenient usage can be provided without undue increase in the cost of reading instruments, and, accordingly, it is believed that the disclosed instruments fully satisfy all of the stated objectives or any additional purposes or requirements for units of this type. Accordingly, the instruments illustrated and described represent preferred embodiments of the invention. It is believed, however, that the invention is adaptable to various modifications and changes. Accordingly, all such modifications and changes coming within the scope of the appended claims are considered to be a part of this invention.

I claim:

1. A hand held reading guide instrument for use along and against a page of reading material to improve reading skills comprising a basic support unit inclusive of a cross member to be positioned against said written page, a handle shank disposed upwardly and rearwardly from said cross member and a handle on said shank, said handle providing opposed finger accommodating gripping surfaces disposed in position normal to the surface of said page and a further surface for finger engagement disposed angularly with respect to said gripping surfaces.

2. Structure as set forth in claim 1 wherein said further engagement surface on said handle comprises a top element disposed generally at right angles to said finger gripping surfaces and extending laterally and outwardly therefrom.

3. Structures as set forth in claim 2 wherein said top element provides opposed finger engagement surfaces.

4. Structure as set forth in claim 3 wherein said top element is provided with a dished or concave top surface and wherein said top element is further relieved inwardly adjacent the point of maximum concavity.

5. Structure as set forth in claim 1 wherein lock elements are provided on said cross member and further comprising an attachment for engagement to said cross member to provide an additional reading guide element.

6. Structure as set forth in claim 5 wherein said attachment comprises a guide to be disposed beneath lines of reading material, said guide extending from said cross member parallel to said shank but in an opposite direction therefrom.

7. Structure as set forth in claim 6 wherein a plurality of guides are provided for attachment to said cross member to extend outwardly therefrom in spaced apart parallel relationship.

8. Structure as set forth in claim 7 wherein blocking elements are provided to extend between said parallel guides for separating the observed reading material into both horizontal and vertical patterns.

9. Structure as set forth in claim 5 wherein said attachment comprises an extension disposed in position aligned with said cross member to provide a reading guide element of increased length disposed at an angle with respect to said handle shank.

10. Structure as set forth in claim 9 wherein a plurality of pointers are provided for selective positioning along said cross member and extension.

References Cited

UNITED STATES PATENTS

| | | | |
|---|---|---|---|
| 1,872,807 | 8/1932 | Posner | 116—119 |
| 2,735,193 | 2/1956 | Moulton | 35—35 |
| 3,105,310 | 10/1963 | Schaill | 35—35 |

EUGENE R. CAPOZIO, *Primary Examiner.*

W. H. GRIEB, *Examiner.*